United States Patent [19]

Ransick

[11] Patent Number: 5,150,859

[45] Date of Patent: Sep. 29, 1992

[54] WINGTIP TURBINE

[75] Inventor: Thomas F. Ransick, Rockford, Ill.

[73] Assignee: Sundstrand Corporation, Rockford, Ill.

[21] Appl. No.: 257,185

[22] Filed: Oct. 11, 1988

Related U.S. Application Data

[63] Continuation of Ser. No. 944,960, Dec. 22, 1986, abandoned.

[51] Int. Cl.$^5$ .............................................. B64D 41/00
[52] U.S. Cl. ........................................ 244/58; 244/199; 290/55
[58] Field of Search ............... 244/204, 207, 199, 130, 244/134 R, 134 C, 134 B, 58; 416/41 A; 290/43, 44, 54, 55

[56] References Cited

U.S. PATENT DOCUMENTS

| | | |
|---|---|---|
| 1,495,036 | 5/1924 | Palmer . |
| 2,075,817 | 4/1937 | Loerke . |
| 2,485,218 | 10/1949 | Shaw . |
| 2,514,105 | 7/1950 | Thomas ........................ 244/134 B |
| 2,650,752 | 9/1953 | Hoadley . |
| 2,650,781 | 9/1953 | Taylor . |
| 2,760,740 | 8/1956 | Brass . |
| 3,057,154 | 10/1962 | Sherlaw et al. . |
| 3,058,695 | 10/1962 | Simonis . |
| 3,062,483 | 11/1962 | Davidson . |
| 3,069,116 | 12/1962 | Ward . |
| 3,085,740 | 4/1963 | Wagner . |
| 3,098,632 | 7/1963 | Christenson . |
| 3,411,738 | 11/1968 | Sargent . |
| 3,662,975 | 5/1972 | Driskill . |
| 3,841,587 | 10/1974 | Freed . |
| 3,873,233 | 3/1975 | Linck . |
| 3,917,193 | 11/1975 | Runnels, Jr. . |
| 3,920,203 | 11/1975 | Moorehead . |
| 3,932,058 | 1/1976 | Harner et al. . |
| 3,934,844 | 1/1976 | Reighart, II . |
| 3,984,070 | 10/1976 | Patterson, Jr. . |
| 3,987,987 | 10/1976 | Payne et al. . |
| 3,997,132 | 12/1976 | Erwin . |
| 4,045,144 | 8/1977 | Loth ................................. 244/199 |
| 4,047,832 | 9/1977 | Sforza ............................. 244/199 |
| 4,105,362 | 8/1978 | Sforza . |
| 4,111,594 | 9/1978 | Sforza . |
| 4,130,258 | 12/1978 | Fox . |
| 4,172,574 | 10/1979 | Spillman . |
| 4,204,799 | 5/1980 | de Geus . |
| 4,222,242 | 9/1980 | Moseley . |
| 4,251,040 | 2/1981 | Loyd . |
| 4,258,889 | 3/1981 | Hunt . |
| 4,285,481 | 8/1981 | Biscomb . |
| 4,296,899 | 10/1981 | Isenberg . |
| 4,324,985 | 4/1982 | Oman . |
| 4,406,431 | 9/1983 | Heuberger . |
| 4,418,880 | 12/1983 | de Waal . |
| 4,428,711 | 11/1984 | Archer . |
| 4,490,093 | 12/1984 | Chertok et al. .................. 416/41 A |
| 4,533,101 | 8/1985 | Patterson, Jr. . |
| 4,917,332 | 4/1990 | Patterson ........................... 244/199 |

FOREIGN PATENT DOCUMENTS 850918 9/1938 France .............................. 244/199

OTHER PUBLICATIONS

Portnoy, "Aerodynamics Effects of Vorfex Suppressors" AD/A-003 750 /// AFOSR-TR-75-0013, Jul. 1974.

SAE Technical Paper Series 821436, Design Aspects of Systems In All Electric Aircraft.

Primary Examiner—Galen Barefoot
Attorney, Agent, or Firm—Wood, Phillips, VanSanten, Hoffman & Ertel

[57] ABSTRACT

An apparatus for generating power from a trailing vortex induced at the wingtip of an aircraft. A turbine is mounted on the wingtip and is disposed in the trailing vortex. The turbine includes propeller blades extending generally parallel to the axial component of the vorted velocity of the vortex to utilize substantially only the radial component of the vorted velocity of the vortex to thereby reduce the vortex strength and decrease wing drag. The turbine is coupled to an operative system of the aircraft for providing power to the system from the turbine, such as a wing de-icing system, a wing boundary layer control system, a hydraulic pump and an electric generator.

12 Claims, 3 Drawing Sheets

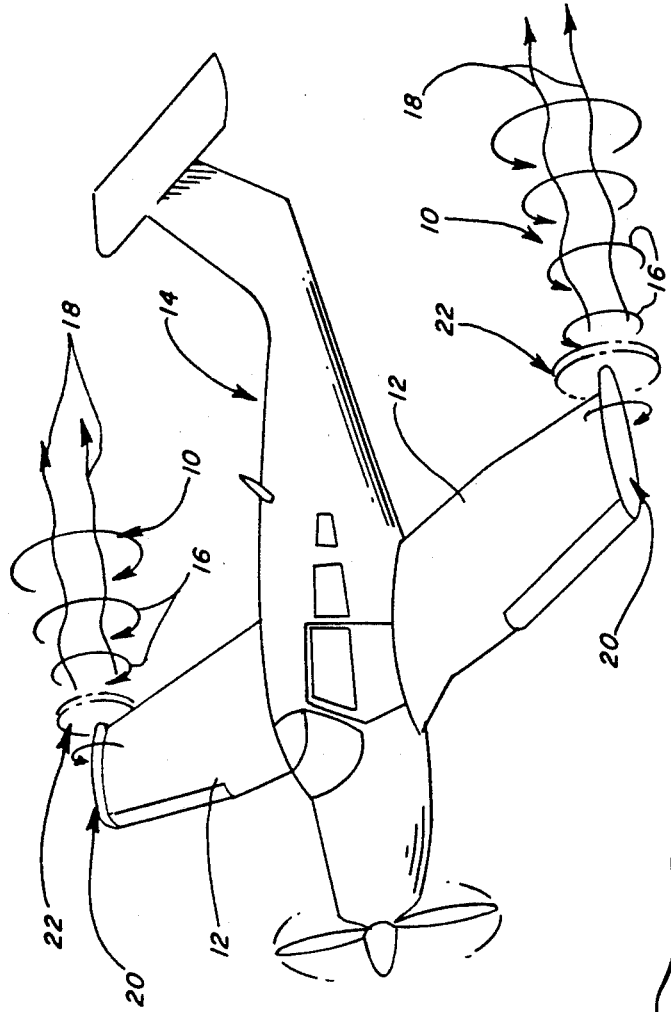
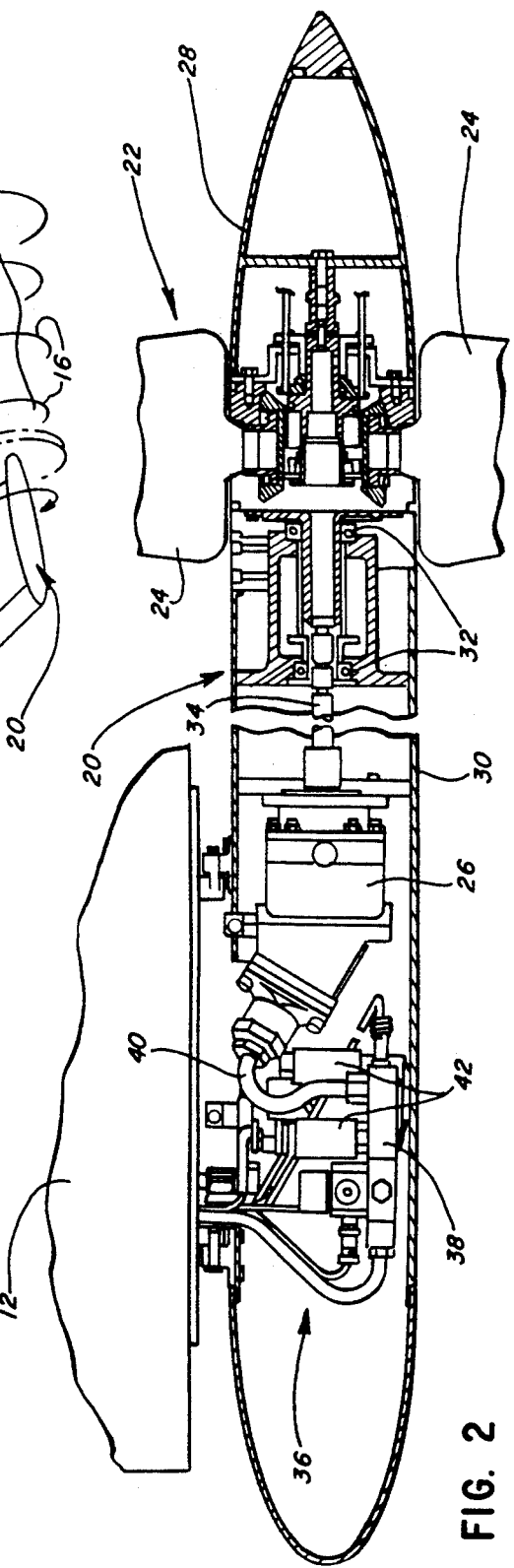
FIG. 1
FIG. 2

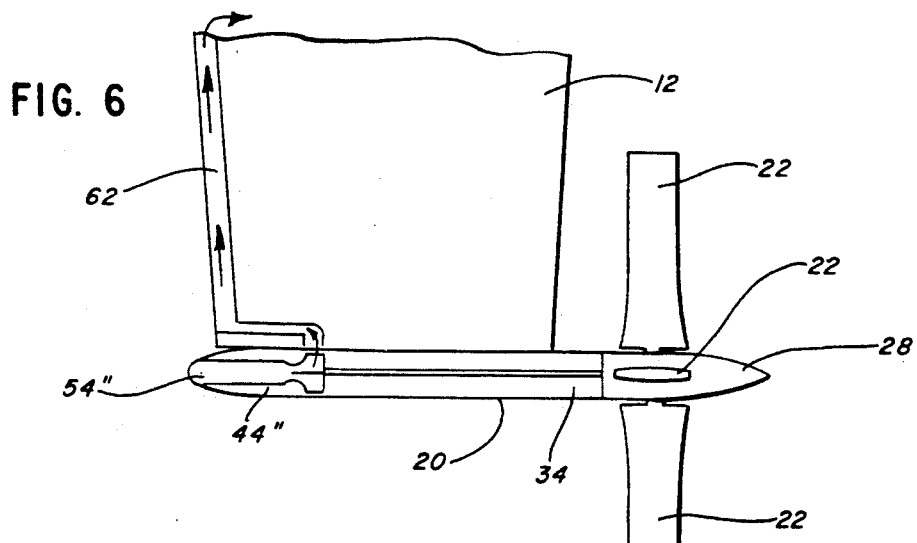
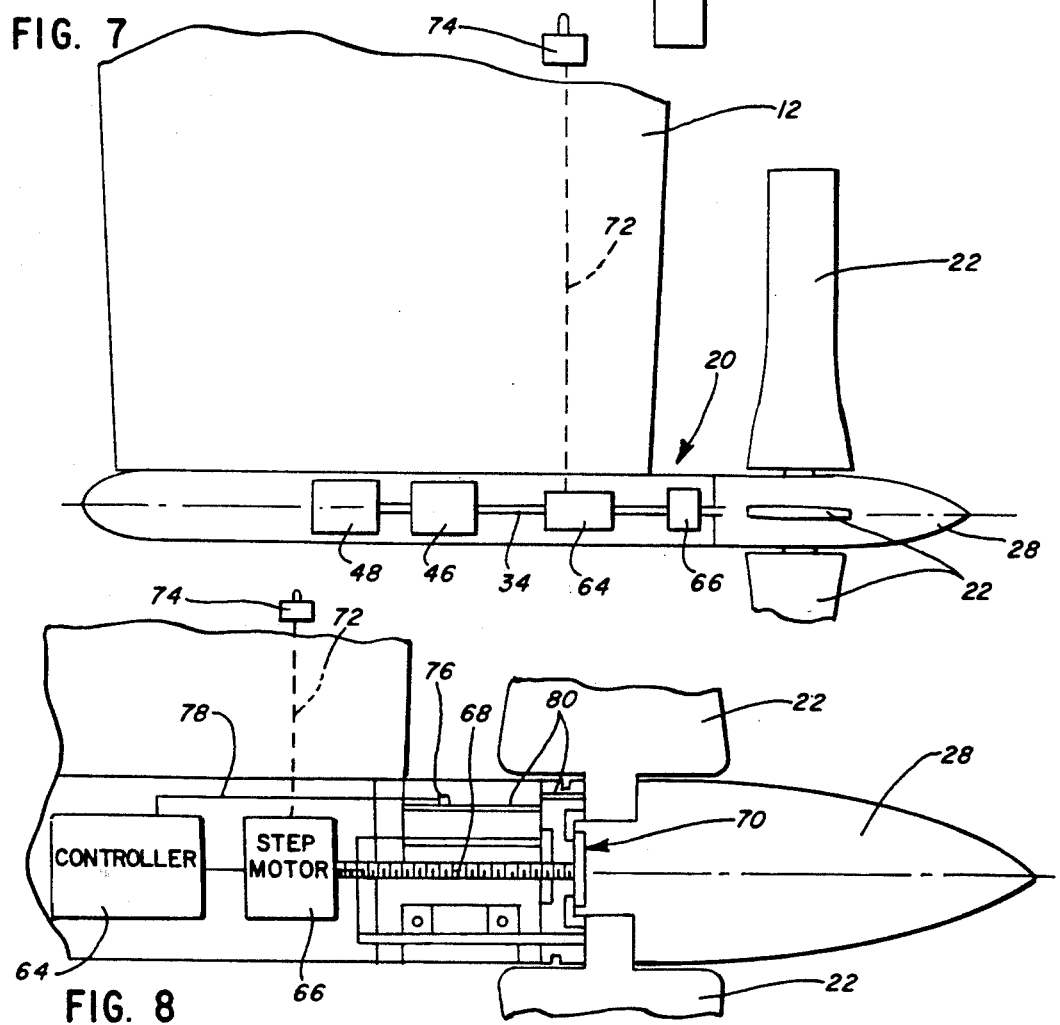

WINGTIP TURBINE

This application is a continuation of application Ser. No. 944,960, filed Dec. 22, 1986, now abandoned.

FIELD OF THE INVENTION

This invention relates to an apparatus for generating power from a trailing vortex induced at the wingtip of an aircraft.

BACKGROUND OF THE INVENTION

It is known that the air beneath an aircraft wing tends to move around the wingtip from the bottom, which has a greater air pressure, to the top, which has a lower air pressure, thereby creating vortices which contribute to the inefficiencies of the wing and reduce its lifting power. In other words, under lifting conditions, an airfoil creates a vortex system which is shed along its span, with a concentrated vortex centered just behind each wingtip. This vortex system is a by-product of lift which is not necessary for the production of lift and is a major source of aircraft induced drag. The vortex or rotational air flow developed at or near the wingtip of an aircraft induces a rolling moment which comprises both rotational and axial components of the vorted velocity of the vortex.

Various attempts have been made to limit the vortex effect to decreaase both induced drag and danger to following aircraft. For instance, U.S. Pat. No. 2,485,218 to Shaw, dated Oct. 18, 1943, shows an airfoil rotor forming the actual wingtip itself, the rotor being powered either by a motor or a propeller located in front of the wingtip. The rotor is rotated in a direction to cause circulation opposing the normal wingtip vortex, thereby influencing the airflow around the tip of the aircraft wing to reduce the induced drag of the vortex.

Similar approaches are shown in U.S. Pat. Nos. 3,984,070 and 4,533,101 to Patterson, Jr., dated Oct. 5, 1976 and Aug. 6, 1985, respectively. Both of these patents show blades or propellers behind the aircraft wingtips to force a breakup of the rotational air flow of the vortices. In the earlier patent, the blades are not powered. In the latter patent, the blades are power rotated opposite the direction of the vortex to attenuate or mitigate the vortex effects. In all of these approaches, efforts are made to breakup both the rotational and axial components of the vorted velocities and in no way are directed to generating power from the vortices.

U.S. Pat. No. 4,045,144 to Loth, dated Aug. 30, 1977, shows a grounded wing energy concentrator which employs a turbine disposed outside the rolled-up vortex. Duct means provide fluidic communication between the turbine and the rolled-up vortex to extract power therefrom, and an air inlet is provided for the turbine. However, although the Loth concentrators extract energy from the ground wind induced vortices, the turbines include blades which react against the axial or longitudinal component of the vorted velocity of the vortex. If such a concentrator were used in an aircraft, even though energy would be extracted from the vortex by the turbine and, thereby, reduce the aircraft drag, some component of drag would be added back into the system because the turbine blades oppose the axial component of the vorted velocity of the vortex.

This invention is directed to a new and improved apparatus for generating power from a wingtip induced vortex without, itself, creating any drag on the system. The power derived from the apparatus is used to drive various systems of the aircraft.

SUMMARY OF THE INVENTION

An object, therefore, of the invention is to provide a new and improved apparatus for generating power from a trailing vortex induced at the wingtip of an aircraft without creating extraneous drag from the apparatus itself. The invention contemplates using the power from the apparatus to drive such operative systems of the aircraft as wing de-icing systems, wing boundary layer control systems, electric generator systems and hydraulic systems.

In the exemplary embodiment of the invention, the apparatus includes turbine means mounted on the aircraft wingtip and disposed in the trailing vortex for extracting a substantial portion of only the rotational energy of the vortex. The turbine is coupled to an operative system of the aircraft for providing power to the system from the turbine.

Specifically, the turbine includes propeller means oriented to utilize substantially only the radial component of the vorted velocity of the vortex to thereby reduce the vortex strength and decrease wing drag without creating extraneous drag from the turbine itself. Controller means may be provided for automatically changing the pitch of the propeller means to maintain the propeller means generally parallel to the axial component of the vorted velocity of the vortex. Manual override means may be coupled to the controller means.

The turbine is designed to provide shaft power to various operative systems, such as a wing de-icing system and a wing boundary layer control system, by utilizing compressor means coupled to the turbine to receive rotary shaft power therefrom. The turbine may be coupled to hydraulic pump means or electric generator means for operating environmental control systems or providing accessory power for the aircraft.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of an aircraft having a power generating turbine disposed in the trailing vortex at each wingtip of the aircraft, according to the invention;

FIG. 2 is a fragmented, axial section through an embodiment of a turbine, according to the invention, for providing shaft power to a hydraulic pump;

FIG. 6 is a somewhat schematic illustration of the turbine being used to operate a wing de-icing system; and FIGS. 7 and 8 are somewhat schematic illustrations of controller means employed for controlling the pitch of the turbine propeller blades.

DETAILED DESCRIPTION OF THE PREFERRED EMBODIMENT

Figure 3:
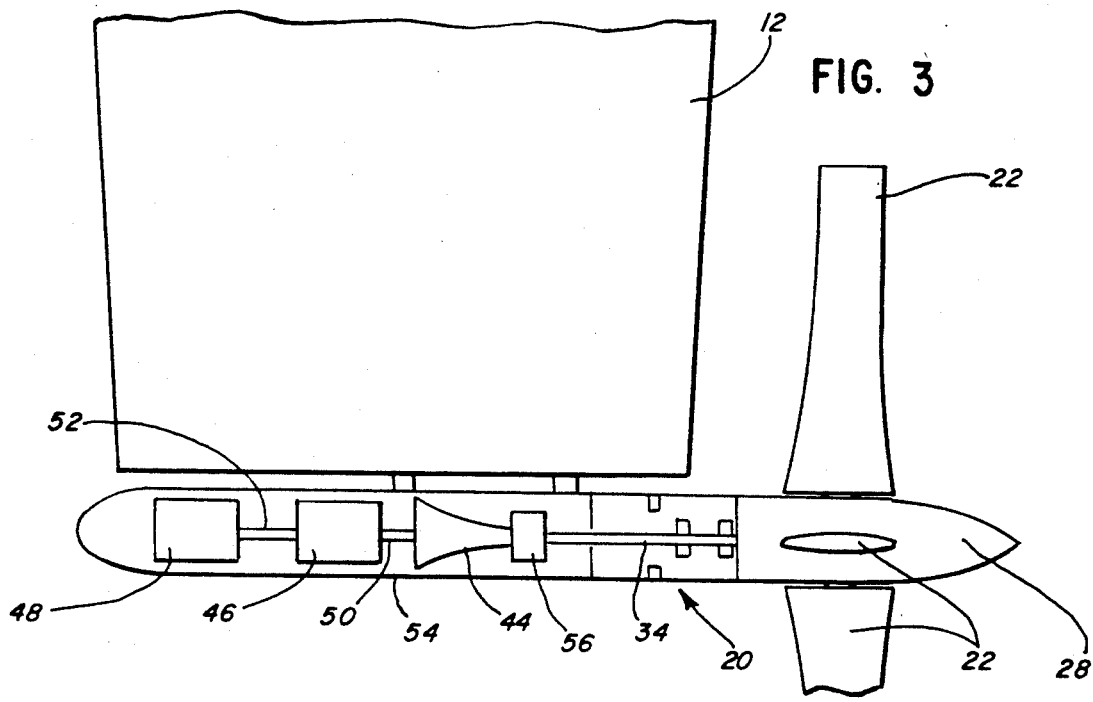
FIG. 3 is a somewhat schematic illustration of the turbine being used to operate various components such as a compressor, a pump and a generator.

Referring to the drawings in greater detail, and first to FIG. 1, the invention generally contemplates an apparatus for generating power from the trailing vortices, generally designated 10, induced at the tip of wings 12 of an aircraft, generally designated 14. It should be understood that any trailing vortex induced at the wingtip of an aircraft includes both radial components 16 and axial components 18 of the vorted velocity of the vortex. Any device disposed for counteracting these energy components will extract energy from the vortex and thereby reduce or mitigate the drag effect of the vortex on the aircraft. However, particularly in the case of the axial components of the vorted velocity of the vortex, should the device itself create a drag opposing aircraft movement, the energy extraction does not efficiently reduce the drag created by the vortex. The invention is designed to extract a substantial portion of only the rotational energy of the trailing vortex for use in driving various systems of the aircraft.

More particularly, the invention contemplates mounting a turbine, generally designated 20, on each wingtip and including propeller means, generally designated 22, for extracting rotational energy from the vortex.

Specifically, referring to FIG. 2, propeller means 22 include a plurality of propeller blades 24 oriented generally parallel to the axial components 18 (FIG. 1) of the vorted velocity of the vortex. Therefore, the propeller blades utilize substantially only the radial components 16 of the vorted velocity of the vortex to thereby reduce the vortex strength and decrease wing drag without adding any drag components to the system.

FIG. 2 further shows the details of turbine 20 for providing shaft power to a hydraulic system which includes a rotary pump 26. More particularly, propeller means 22 are mounted on a hub and rear cone assembly 28 of turbine 20 whereby this entire assembly is rotatable relative to a forward turbine housing 30 by means of bearings 32. A shaft 34 is appropriately coupled for rotation with the propeller means, the shaft being connected to pump 26 for operating the pump. A load device representing various aircraft hydraulic systems, generally designated 36, is mounted within turbine housing 30 and includes such components as a manifold 38 in communication with pump 26 by an exhaust pipe 40. Pressure transducers 42 are connected to the manifold for measuring the hydraulic power to appropriate drive means for various systems of the aircraft.

FIG. 3 shows a somewhat schematic illustration wherein the turbine provides shaft power to a compressor 44, a hydraulic pump 46 and an electric generator 48. Shaft 34 simply is extended through compressor 44, as at 50, to pump 46 and through the pump, as at 52, to generator 48.

Air inlets 54 are provided to compressor 44, and a gear box 56 is coupled between shaft 34 and the compressor for increasing the rotational speed of the compressor. The compressor may be used for operating such systems as wing de-icing systems or wing laminar flow control systems, as described hereinafter. The compressor also may be utilized for environmental control systems of the aircraft which conventionally require bleeding off air from the aircraft's engine.

Hydraulic pump 46 may be used to provide auxiliary emergency power, such as driving the control surfaces of the aircraft. Electric generator 48 may be employed for providing electrical power to accessories of the aircraft or to provide pitch control for the turbine propeller blades themselves.

Figure 4:
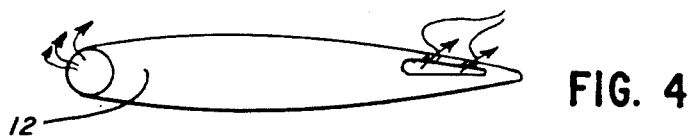
FIGS. 4 and 5 are somewhat schematic illustrations of the turbine being used to operate a wing boundary layer control system.
Figure 5:
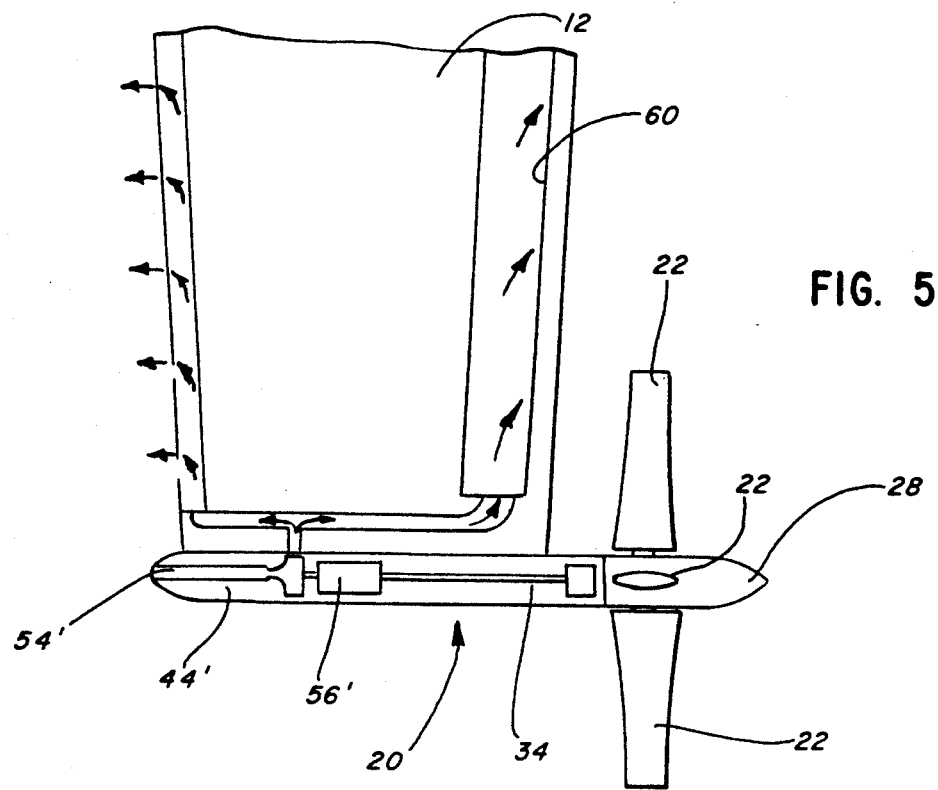

FIGS. 4 and 5 somewhat schematically illustrate turbine 20 used for operating a wing boundary layer control system of the aircraft. More particularly, a compressor 44' again is provided shaft power from propeller blades 22 and shaft 34 and includes an air intake 54' and a gear box 56'. The compressed air is forced into a forward duct 58 extending along the leading edge of wing 12 and a rear duct 60 extending along and near the top of the trailing edge of the wing. As is known, separation of air flowing along the top of wing 12 reduces lift and increases drag on the aircraft. If air is put into the separation area, the point of separation is moved rearwardly of the top of the wing to reduce the effects of the boundary layer air separation. Therefore, compressor 56' supplies air through duct 58, out appropriate ports as indicated by arrows "A", and along the leading edge of the wing to provide more clinging air along the wing surface. The compressor supplies air through duct 60 and outports 61, as indicated by arrows "B" (FIG. 4), to place more air into the separation area along the top of the wing airfoil. All of this is accomplished without extracting any power from the aircraft engine or by means of auxiliary power sources, by extracting energy from the wingtip trailing vortex which energy otherwise simply would be dissipated into the atmosphere.

FIG. 6 illustrates somewhat schematically turbine 20 employed to operate a compressor 44" which includes an air intake 54". The compressor supplies air to a closed duct 62, the air being warmed to de-ice the leading edge of wing 12.

FIGS. 7 and 8 illustrate somewhat schematically turbine 20 again having the propeller means providing shaft power through shaft 34 to a hydraulic pump 46 and an electric generator 48, for purposes similar to that described in relation to FIG. 3. The system of FIG. 7 includes a controller 64 coupled to a step motor 66 for rotating a screw shaft 68 (FIG. 8) which is geared, as at 70, to propeller blades 22. Energization of step motor 66, through screw shaft 68 and gear means 70, effectively varies or controls the pitch of propeller blades 22. Energization can be initiated either manually or automatically. For manual operation, step motor 66 is coupled, as at 72, to control means 74 in the aircraft cockpit. Automatic control of the pitch of the propeller blades can be accomplished by a strain gauge 76 which feeds a signal, as at 78, to controller 64 which controls step motor 66. The strain gauge is coupled, as at 80, to one or more regions of the non-rotating part of the assembly 20 to sense axial load thereon. Such a load would indicate that the propeller blades are not parallel to the axial components of the vorted velocity of the vortex because the axial components tend to increase drag on the propeller blades which is sensed by the strain gauge. Therefore, automatic pitch control can be provided by the utilization of such a sensing means and the controller which energizes step motor 66 which, of course, should be a reversible motor. Such circumstances might occur during cross-wind conditions. Again, maintaining propeller blades 22 generally parallel to the radial components 18 (FIG. 1) of the vorted velocity of the vortex eliminates any drag on the aircraft caused by the propeller blades, while the blades extract energy substantially from only the radial components 16 (FIG. 1) of the vorted velocity of the vortex. Cockpit control means 74 also may be connected to the step motor as a manual override for take-off and landing conditions, if required.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus for generating power from a trailing vortex induced at the wingtip of an aircraft, comprising: turbine means mounted on the wingtip, said turbine means including a housing and propeller means disposed in the trailing vortex for extracting a portion of substantially only the rotational energy of the trailing vortex, said propeller means comprising a plurality of propeller blades adjustably oriented to remain generally parallel to the axial component of the vorted velocity of the vortex to utilize substantially only the radial component of the vorted velocity of the vortex to thereby reduce the vortex strength and decrease wing drag; and
means for coupling the wingtip turbine means to a wing de-icing system, and including compressor means located within the housing of the turbine means and coupled to the propeller means disposed in the trailing vortex for operating the wing de-icing system.

2. The apparatus of claim 1, including controller means for automatically changing the pitch of said propeller means to maintain the propeller means generally parallel to the axial component of the vorted velocity of the vortex.

3. The apparatus of claim 2, including manual override means coupled to said controller means.

4. The apparatus of claim 1 wherein said compressor means is connected at one end to an air intake located within said housing, and at the other end to a duct extending along the wing, said compressor means supplying air from the intake to the duct for de-icing the wing.

5. An apparatus for generating power from a trailing vortex induced at the wingtip of an aircraft, comprising: turbine means mounted on the wingtip, said turbine means including a housing and propeller means disposed in the trailing vortex for extracting a portion of substantially only the rotational energy of the trailing vortex, said propeller means comprising a plurality of propeller blades adjustably oriented to remain generally parallel to the axial component of the vorted velocity of the vortex to utilize substantially only the radial component of the vorted velocity of the vortex to thereby reduce the vortex strength and decrease wing drag; and
means for coupling the wingtip turbine means to a wing boundary layer control system and including compressor means located within the housing of the turbine means and coupled to the turbine means for operating the wing boundary layer control system.

6. An apparatus for generating power from a trailing vortex induced at the wingtip of an aircraft, comprising: turbine means mounted on the wingtip, said turbine means including a housing, rotatable shaft means within said housing and propeller means disposed in the trailing vortex for extracting a portion of substantially only the rotational energy of the trailing vortex, said propeller means comprising a plurality of propeller blades adjustably oriented to remain generally parallel to the axial component of the vorted velocity of the vortex to utilize substantially only the radial component of the vorted velocity of the vortex to thereby reduce the vortex strength and decrease wing drag; and
a wing de-icing system for the aircraft, including compressor means located within the housing of the turbine means and coupled to the shaft means of the wingtip turbine means for feeding the wing de-icing system in response to shaft power from the turbine means.

7. The apparatus of claim 6 wherein said compressor means is connected at one end to an air intake located within said housing, and at the other end to a duct extending along the wing, said compressor means supplying air from the intake to the duct for de-icing the wing.

8. An apparatus for generating power from a trailing vortex induced at the wingtip of an aircraft, comprising: turbine means mounted on the wingtip, said turbine means including a housing, rotatable shaft means within said housing and propeller means disposed in the trailing vortex for extracting a portion of substantially only the rotational energy of the trailing vortex, said propeller means including a plurality of propeller blades adjustably oriented relative to said shaft to remain generally parallel to the axial component of the vorted velocity of the vortex to utilize substantially only the radial component of the vorted velocity of the vortex to thereby reduce the vortex strength and decrease wing drag.

9. The apparatus of claim 8 wherein said compressor means is connected at one end to an air intake located within said housing, and at the other end to a duct extending along a leading edge of the wing and a duct extending along a trailing edge of the wing, said compressor means supplying air from the intake to said ducts.

10. An apparatus for generating power from a trailing vortex induced at the wingtip of an aircraft, comprising: turbine means mounted on a wingtip, said turbine means including a housing and propeller means disposed in the trailing vortex and extending generally parallel to the axial component of the vorted velocity of the vortex for utilizing substantially only the radial component of the vorted velocity of the vortex to thereby reduce the vortex strength and decrease wing drag;
controller means within the housing of the wingtip turbine means for automatically changing the pitch of said propeller means to maintain the propeller means generally parallel to the axial component of the vorted velocity of the vortex; and
means for coupling the turbine means of an operative system of the aircraft for providing power to the system from the turbine means.

11. The apparatus of claim 10, including manual override means coupled to said controller means.

12. The apparatus of claim 10, including sensor means coupled to said propeller means to sense the axial load thereon.

* * * * *